(12) United States Patent　　(10) Patent No.: US 8,035,893 B2
Creel　　(45) Date of Patent: Oct. 11, 2011

(54) COLLAPSIBLE PROJECTION SCREEN SYSTEMS

(76) Inventor: Silas Creel, Berowra Waters (AU)

( * ) Notice: Subject to any disclaimer, the term of this patent is extended or adjusted under 35 U.S.C. 154(b) by 1235 days.

(21) Appl. No.: 11/579,851

(22) PCT Filed: May 12, 2004

(86) PCT No.: PCT/AU2004/000619
§ 371 (c)(1),
(2), (4) Date: Nov. 8, 2006

(87) PCT Pub. No.: WO2005/109092
PCT Pub. Date: Nov. 17, 2005

(65) Prior Publication Data
US 2008/0030853 A1　　Feb. 7, 2008

(51) Int. Cl.
*G03B 21/56* (2006.01)
(52) U.S. Cl. .................................. 359/443; 359/461
(58) Field of Classification Search .................. 359/443, 359/461
See application file for complete search history.

(56) References Cited

U.S. PATENT DOCUMENTS

| | | | | |
|---|---|---|---|---|
| 1,901,963 | A * | 3/1933 | Hansen | 38/102.5 |
| 4,110,792 | A | 8/1978 | Long et al. | |
| 5,127,722 | A | 7/1992 | Nishitani | |
| 5,706,130 | A * | 1/1998 | Rosen | 359/443 |
| 7,327,516 | B2 * | 2/2008 | Wheeler | 359/443 |
| 7,446,937 | B2 * | 11/2008 | Poretskin | 359/443 |

FOREIGN PATENT DOCUMENTS

| | | |
|---|---|---|
| AU | 774852 | 5/2002 |
| DE | 1 915 079 | 10/1970 |
| DE | 25 42 896 A1 | 3/1977 |
| DE | 3923234 A1 | 1/1991 |
| EP | 0085527 | 8/1983 |
| FR | 2 544 675 A1 | 10/1984 |
| GB | 947218 | 1/1964 |
| JP | 58154833 | 9/1983 |
| JP | 6059247 | 4/1985 |
| JP | 61101737 | 6/1986 |
| JP | 06289490 | 10/1994 |
| JP | 07264526 | 10/1995 |
| JP | 9160129 | 6/1997 |
| JP | 10011005 | 1/1998 |
| JP | 2002229126 | 8/2002 |
| JP | 3091558 | 11/2002 |
| JP | 2004053804 | 2/2004 |

OTHER PUBLICATIONS

Notice of Reasons for Rejection for Japanese Application No. 2007-511762 dated May 26, 2009.

* cited by examiner

*Primary Examiner* — Christopher Mahoney
(74) *Attorney, Agent, or Firm* — Amster, Rothstein & Ebenstein LLP (57) ABSTRACT

A collapsible projection screen system mountable on or at a moveable carriage (10), the system comprising a flexible projection screen (16) moveable between a collapsed position and an erect position in which the screen (16) is supported by a support arrangement (14, 15), and a screen tensioning mechanism (64, 40, 56) operable on the screen (16) in the erect position to provide a generally flat screen surface. In another embodiment there is disclosed a mounting assembly for a flexible projection screen in a collapsible projection screen system having a roller, a mechanism for applying tension across and between a leading edge and a trailing edge of the screen in the erect position, the mechanism comprising a braking device and a drive apparatus.

48 Claims, 9 Drawing Sheets

COLLAPSIBLE PROJECTION SCREEN SYSTEMS

CROSS-REFERENCE TO RELATED APPLICATION

This application is a U.S. national stage entry under 35 U.S.C. §371 of PCT International Application No. PCT/AU2004/000619, filed on May 12, 2004 and published in English as International Publication No. WO 2005/109092 A1.

FIELD OF THE INVENTION

The present invention relates to improvements in collapsible projection screen systems, typically (though not exclusively) screen systems used in outdoor projection applications including outdoor cinemas, concerts, rallys, advertising, signage etc.

BACKGROUND TO THE INVENTION

The applicant has previously developed a collapsible projection screen assembly, which is disclosed in patent application number 87307/01. The applicant has now made improvements to this screen assembly.

SUMMARY OF THE INVENTION

According to a first aspect of the invention there is provided a collapsible projection screen system mountable on or at a moveable carriage, the system comprising:

a flexible projection screen movable between a collapsed position and an erect position in which the screen is supported by a support arrangement; and in addition to the support arrangement, a screen tensioning mechanism operable on the screen in the erect position to provide a generally flat screen surface.

Advantageously, by providing a screen tensioning mechanism that acts in addition to the support arrangement, a generally flat screen surface can be achieved. In known collapsible screen systems, once the screen reaches a certain size it becomes difficult to provide a flat screen surface because of the inherent flexibility in the screen. The applicant has developed a screen tensioning mechanism which enables the use of large sized picture screens (eg. commensurate in size with permanent screen installations) whilst providing for projection screen portability. In addition, a tensioned screen can be provided which has greater resistance to air movements including wind, and is structurally more stable and strong.

The screen tensioning mechanism may comprise:
(a) a lateral mechanism for acting on opposite sides of the screen to additionally tension across the screen in use; and/or
(b) a mechanism for acting on in-use upper and lower edges of the screen to additionally tension across the screen in use.

The applicant has discovered that either or both of these tensioning mechanisms can be employed to provide a generally flat screen surface. When used in combination (ie. when both a lateral and top-to-bottom tensioning are applied to the screen) then a very secure, stable and flat erect screen can be achieved, and yet a screen that is highly portable can be provided.

The mechanism in (a) typically provides for maximum additional tension at an in-use centre line located centrally between upper and lower screen edges, progressively reducing to a minimum additional tension adjacent to the upper and lower screen edges. For example, in (a) the additional tension can be provided by one or two curved cables, with the or each cable arranged in or at a respective side edge of the screen such that, when tensioned, each cable causes the additional tension to be applied across the screen. Further, in (a) each cable can be arranged in a respective curved pocket defined in the side edge of the screen, and the pocket can be shaped so as to provide the desired curvature to the cable. The applicant has found that by providing for maximum additional tension at a central horizontal region of the screen, where screen bending or flexing is most likely to take place, maintenance of a flat screen is optimised.

The mechanism in (b) can result in differential tension regions extending across the screen between the upper and lower edges of the screen, eg. to provide one or more in-use vertical tension bands extending between the upper and lower screen edges, the one or more vertical bands having a higher additional tension than adjacent bands extending between the upper and lower screen edges. For example, in (b) the one or more vertical tension bands can result in the vicinity of where the lower edge of the screen is mounted to the carriage. Further, in (b) the lower edge of the screen can be mounted to a roller and the one or more vertical tension bands can result in the vicinity of where the roller is mounted to the carriage.

The provision of differential tension regions extending between the upper and lower edges of the screen can also enhance the screen roll-up into the collapsed position (ie. the applicant has surprisingly discovered that any tendency of the screen to crease or roll-up unevenly can be ameliorated or eliminated when differential tension regions are provided). At the same time the differential tension regions can be located to extend through a central region of the screen to also minimise its flexing or folding (eg. the differential tension regions can take the form of a line or band of tension in the screen and thus can function similarly to a batten or reinforcing strip extending through the screen).

The screen tensioning mechanism (b) can also be provided by the mechanism of the seventh aspect as defined below.

Additionally, in (b) the roller can be mounted to the carriage via a bearing assembly. The roller can be connected to the bearing assembly at two points, with each point being inset from a respective end of the roller, whereby a vertical tension band is defined in the vicinity of a respective point, to extend vertically in the screen away therefrom. Each point can be defined in relation to a roller mounting disk that is mounted about its periphery to an inside surface of the roller, with a shaft extending from each disk out beyond the roller for rotational support in the bearing assembly.

According to a second aspect of the invention there is provided a screen tensioning mechanism for use in a collapsible projection screen system, the mechanism being as defined in the first aspect of the invention. For example, the screen tensioning mechanism can be retrofitted to an existing collapsible projection screen.

According to a third aspect of the invention there is provided a mounting assembly for a flexible projection screen in a collapsible projection screen system where the screen is movable between a collapsed position and an erect position, the assembly comprising:

a roller onto which the screen is rolled in the collapsed position, and from which the screen is unrolled when moving into the erect position; and a bearing assembly for supporting the roller during screen movement between the collapsed and erect positions;

wherein the roller is mounted to the bearing assembly in a manner such that, when the screen is rolled onto the roller, the formation of one or more creases therein is ameliorated.

The applicant has surprisingly discovered that the way in which the roller is mounted to a bearing assembly can affect the way in which a screen rolled onto the roller is picked up during roller actuation. The applicant became aware of this problem as it pertained to larger screens, with the tendency of the screen to fold or flex in a central region thereof, resulting in the formation of creases during roll-up of the screen. Advantageously, by positioning at least one of the roller mounting points inset from its end the tendency of the screen to crease during roll-up is ameliorated. In addition, the screen can stay centred in the roller during roll-up.

Typically, at least two inset mounting points (one at either end of the roller) are provided to thereby provide two "pick-up" points for the screen as it is rolled up.

Typically the roller is mounted to the bearing assembly in the manner as defined in the first aspect, whereby the vertical tension bands ameliorate against the formation of creases in the screen.

According to a fourth aspect of the invention there is provided a mounting assembly for a flexible projection screen in a collapsible projection screen system that is mountable on or at a moveable carriage, where the screen is movable between a collapsed position and an erect position, the assembly comprising:

a roller onto which the screen is rolled in the collapsed position, and from which the screen is unrolled when moving into the erect position; and a bearing assembly for supporting the roller during screen movement between the collapsed and erect positions;

wherein the roller is releasable from the bearing assembly to enable roller interchange.

By enabling roller interchange, a collapsible connection screen system can be provided where screens can be interchanged. For example, if the system is to be employed where a backlit screen is desirable as opposed to a front-lit screen, whereby a translucent screen material may be required, then the mounting assembly of the fourth aspect readily enables roller interchange. In addition, rollers can be interchanged for servicing, repair, replacement, or where eg. a banner with an image already positioned thereon is desirably used. In this regard, the system can readily function as an advertising billboard, sign etc.

Hence, throughout this specification, the terminology "projection screen" is to be interpreted broadly and can include a screen where an image has already been pre-defined on the screen.

Typically the roller is mounted to the bearing assembly at opposite ends thereof, wherein one part of the bearing assembly at one end is moveable to enable a roller to be slid into or out of engagement with the bearing assembly. The assembly according to the fourth aspect can otherwise be as defined for the third aspect. In addition, the assembly according to the third and fourth aspects can be employed in the collapsible projection screen system of the first aspect.

According to a fifth aspect of the invention there is provided a collapsible projection screen system mountable on or at a moveable carriage, the system comprising:

one or more support members mountable to the carriage and moveable between a collapsed position and an erect position; and at least two flexible projection screens, each movable between a collapsed position and an erect position, wherein each screen is mountable to the one or more support members.

By providing the system with at least two flexible projection screens, a variety of projection scenarios can advantageously be achieved. For example, an in-use front screen can be used for front-lit projected images whereas an in-use rear screen can be used for receiving backlit images. The screens may be erected simultaneously and, for example, the front screen can be part way erected to reveal a part of the rear screen. Alternatively, each screen can be erected simultaneously and forward projected images can be projected thereon so that an audience can see the same or different images on either side of the carriage.

Whilst optimally at least the two screens are parallel to each other, multiple screens can be employed in a number of geometric patterns eg. three screens can be arranged in a triangular formation, four screens arranged in a square or rectangular formation etc. Thus, a wide variety of effects can be achieved and also time savings can be achieved. Furthermore, whilst one screen is in service or repair, another screen can be readily employed.

Typically the system according to the fifth aspect comprises two support members that can support each of the projection screens in the erect position (ie. one at a time). Alternatively, the system may comprise two respective support members for supporting each projection screen in the erect position. In this regard, just two support members can be used to support a plurality of screens, with each screen being couplable/decouplable to a hoisting apparatus associated with the two support members. Alternatively, each screen may have its own set of two support members, although this latter arrangement is more complex and costly, but can be employed where it is desirable to have two or more screens erected at the same time.

Typically the system according to the fifth aspect comprises two screens, with an in-use front screen for receiving forwardly projected image(s) thereon and an in-use rear screen for receiving rearwardly projected image(s) thereon.

The or each screen in the system according to the first or fifth aspects is, in the erect position, typically adapted to receive image(s) thereon from one or more projectors located remotely from the carriage. Alternatively, one or more of the screens can have images already pre-printed, or painted thereon so that the screen can function as an advertising banner, sign etc.

The system according to the first or fifth aspects typically comprises two support members hingedly mounted to the carriage for pivoting between the collapsed and erect positions, the support members being spaced apart when in the erect position such that the or each screen is mountable to extend between the support members when in the erect position. Thus, both the screen and its supports can be collapsed for transportation, storage etc.

In the system according to the first or fifth aspects the screen is typically retractable into its collapsed position, for example, using a spring-loaded roller about which the screen is rolled in the collapsed position.

In the system according to the first or fifth aspects an in-use upper leading edge of the or each screen is typically attachable at respective upper corners to respective hoisting apparatus, wherein the hoisting apparatus is arranged to hoist and lower the or each screen between the collapsed and erect positions. The hoisting apparatus typically comprises a structural member attached along the leading edge of the or each screen, cables or tapes attached at opposite ends of the structural member, and a respective winching device for winching each cable or tape to hoist and lower the or each screen between the collapsed and erect positions. A cable or tape track, or a pulley-wheel, can be provided at the end of each support member to more easily enable the cable or tape to respectively slide or move thereupon.

The system according to the first or fifth aspects typically comprises a respective truss support hingedly attached to the or each support member for pivoting between truss collapsed and truss erect positions. In the truss erect position, each truss support can be adapted to carry one or more sound speakers and/or lights.

The system according to the first or fifth aspects typically also comprises a sound system mounted on or at the carriage.

The system according to the first or fifth aspects also typically comprises stabilising supports for stabilising the carriage on a ground surface when the screen is in the erect position.

The system according to the fifth aspect typically can comprise a screen tensioning mechanism as defined in the second aspect and/or a mounting assembly as defined in the third and fourth aspects.

In the system according to the invention the or each screen can be perforated to assist with air release thereacross/therethrough in windy conditions, and to provide for screen weight reduction.

The support arrangement in the system of the first aspect typically comprises the one or more support members as defined in the fifth aspect.

According to a sixth aspect of the invention there is provided, in a collapsible projection screen system comprising at least one flexible projection screen that is movable between collapsed and erect positions, a structural member for mounting to a leading edge of the or each screen to facilitate its movement between the collapsed and erect positions, the structural member comprising at least two elongate bars interconnected by a truss-type framework along their lengths.

The terminology "bars" includes rods, tubes, and other elongate members. The employment of a structural member provides for more robust hoisting and lowering of the screen and more readily facilitates screen support by adjacent support member(s). By providing a truss-type framework in the structural member a robust member can be produced that is formed from light weight materials (eg. aluminium, alloy and other light weight metals). The truss structure also prevents bowing and flexing of the screen leading edge which results in smooth hoisting and lowering of the screen. In addition, where two or more screens are employed in the system, the provision of a structural member at each leading edge enables easy screen interchange.

Typically the structural member comprises three elongate bars, with each bar interconnected along its length by respective truss-type frameworks to each other bar, to define a structural member that has, in end view, a triangular profile. The applicant has found that the triangular profile provides optimum strength to the structural member without compromising the light weight of the structural member. Typically each elongate bar is a tube such as an aluminium (or alloy) tube. Typically each truss-type framework comprises a plurality of struts arranged in an alternating sequence along a length of the member, with each strut extending from one bar to the next at an angle with respect to a longitudinal axis of each bar to define a series of truss-triangles along the length of the member. Again, the struts can be slender for weight reasons and yet their truss-type arrangement maximises structural member strength.

In the system according to the first or fifth aspects the or each screen can have mounted to its leading edge a structural member as defined in the sixth aspect.

According to a seventh aspect of the invention there is provided, in a collapsible projection screen system comprising at least one flexible projection screen that has a leading edge that is movable between collapsed and erect positions, a mechanism for applying tension across and between the leading edge and a trailing edge of the screen when in the erect position, the mechanism comprising a braking device for preventing a retraction of the leading edge into the screen collapsed position, and a drive apparatus for relative urging of the leading edge away from the trailing edge whereby, when the leading edge is so urged, the braking device can be activated to prevent the leading edge retraction into the screen collapsed position and thereby maintaining tension across the screen.

The mechanism of the seventh aspect advantageously comprises a braking device which can be selectively activated to, for example, lock the leading edge of the screen into a desired position. For example, when the leading edge is being pulled up and away from the trailing edge of the screen (eg. by cables or ties) the braking device can lock either the leading edge, or cables or ties connected thereto, in that position and thus maintain tension in the screen. The screen tension helps in providing a generally flat screen and also provides structural stability to the screen to assist in its resisting wind action, inadvertent movement, bumping etc.

Typically the drive apparatus comprises a drive connected to the leading edge and adapted to urge the leading edge away from the trailing edge. The drive can comprise one or more winches, the or each winch connected to the leading edge via a respective cable or tie. For example, when the drive comprises two winches, each winch can be connected to a respective screen corner at the leading edge via a respective cable or tie. In addition, the or each cable or tie can be connected to the leading edge via a structural member, such as defined in the sixth aspect of the invention.

Alternatively or additionally the drive apparatus can comprise a retractor drive connected to the trailing edge and adapted to urge the trailing edge away from the leading edge. The retractor drive can form part of a roller assembly onto which the screen is rolled when moving towards the collapsed position. In this regard, the retractor drive can comprise a spring mechanism in the roller assembly which is progressively tensioned when the screen is unrolled from the roller assembly when moving towards the erect position. The retractor drive alternatively or additionally can comprise a motor for acting on the roller assembly in a manner that causes the screen to be rolled towards the collapsed position, and which can be actuated to significantly increase screen tension.

Typically the braking device is a respective pair of calliper brakes for gripping the or each cable or tie and preventing its movement. Alternatively or additionally the braking device can comprise a stop that limits or restricts the movement of the leading edge from the trailing edge. For example, the braking device can comprise a stop mechanism in either the retractor device or in support member tracks for the leading edge.

The mechanism according to the seventh aspect can advantageously also function as the screen tensioning mechanism (b) as defined in the first aspect according to the invention.

BRIEF DESCRIPTION OF THE DRAWINGS

Notwithstanding any other forms which may fall within the scope of the present invention, preferred forms of the invention will now be described, by way of example only, with reference to the accompanying drawings in which.

MODES FOR CARRYING OUT THE INVENTION

Figure 1:
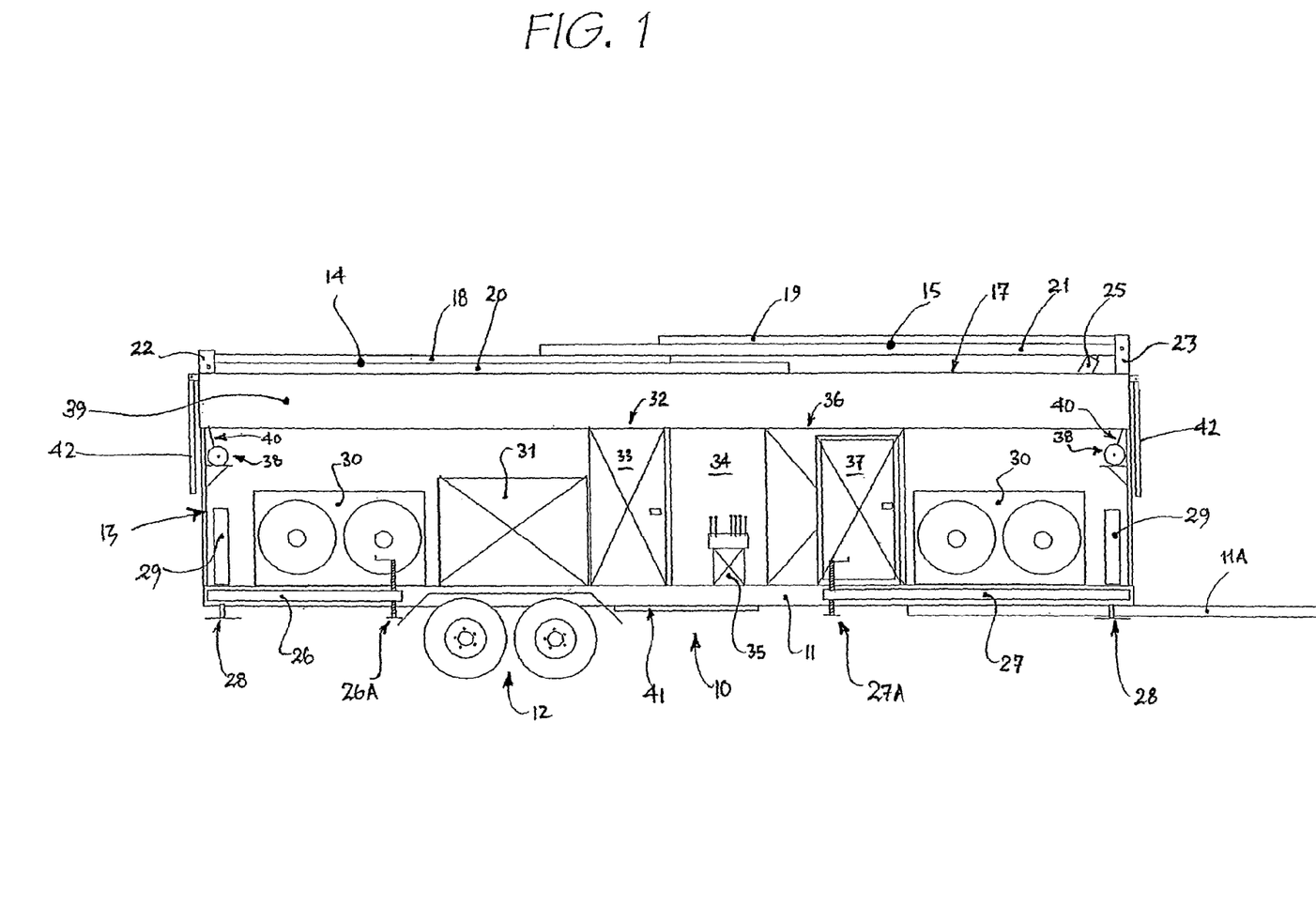
FIG. 1 shows a front elevation of a preferred portable projection screen system in a collapsed (transportable) configuration in accordance with the invention.
Figure 5:
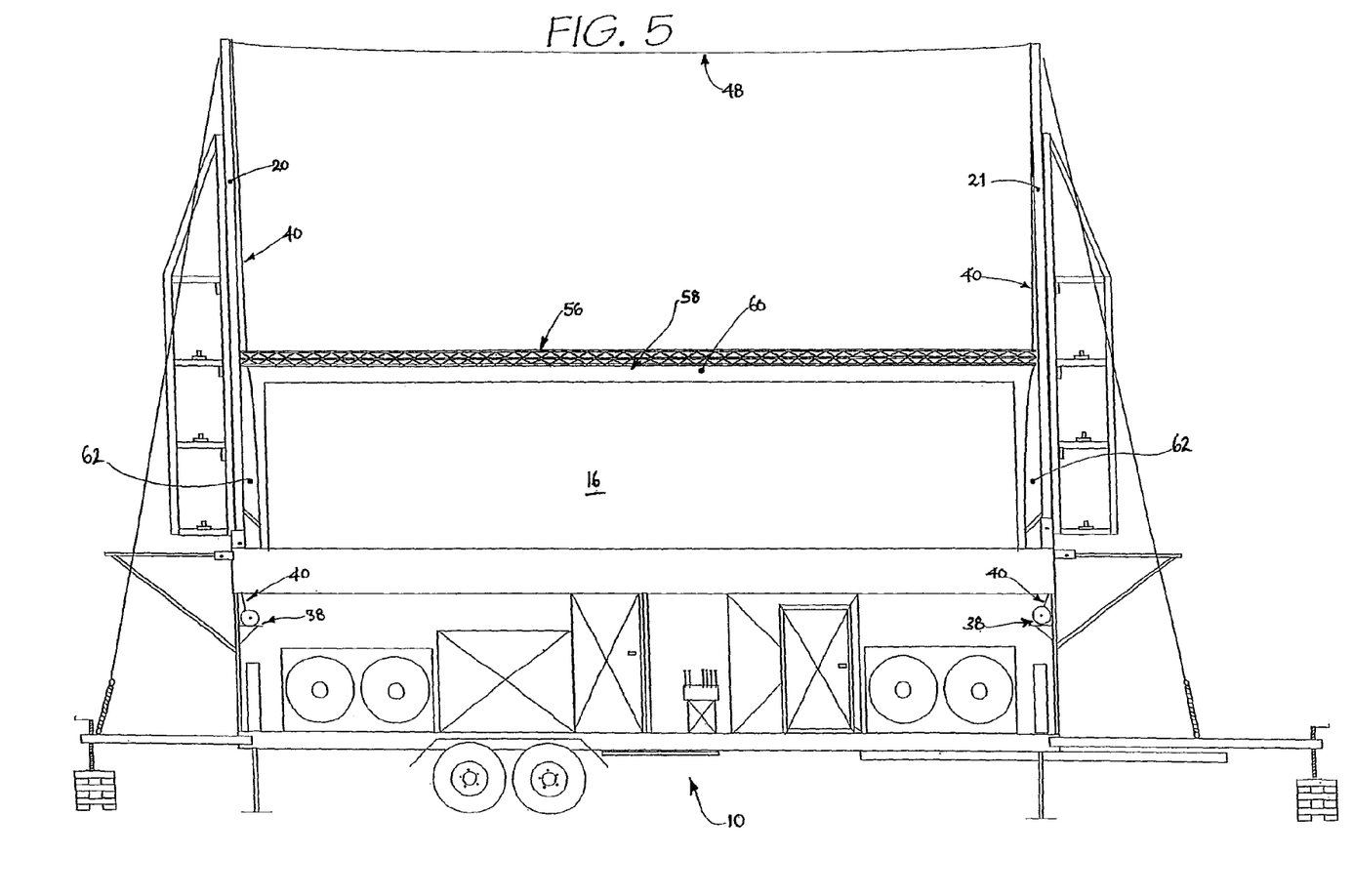
FIG. 5 shows the system of FIG. 4 in a further advanced stage of erection (projection screen and screen leading edge structural member partially raised along left and right screen supports)
Figure 6:
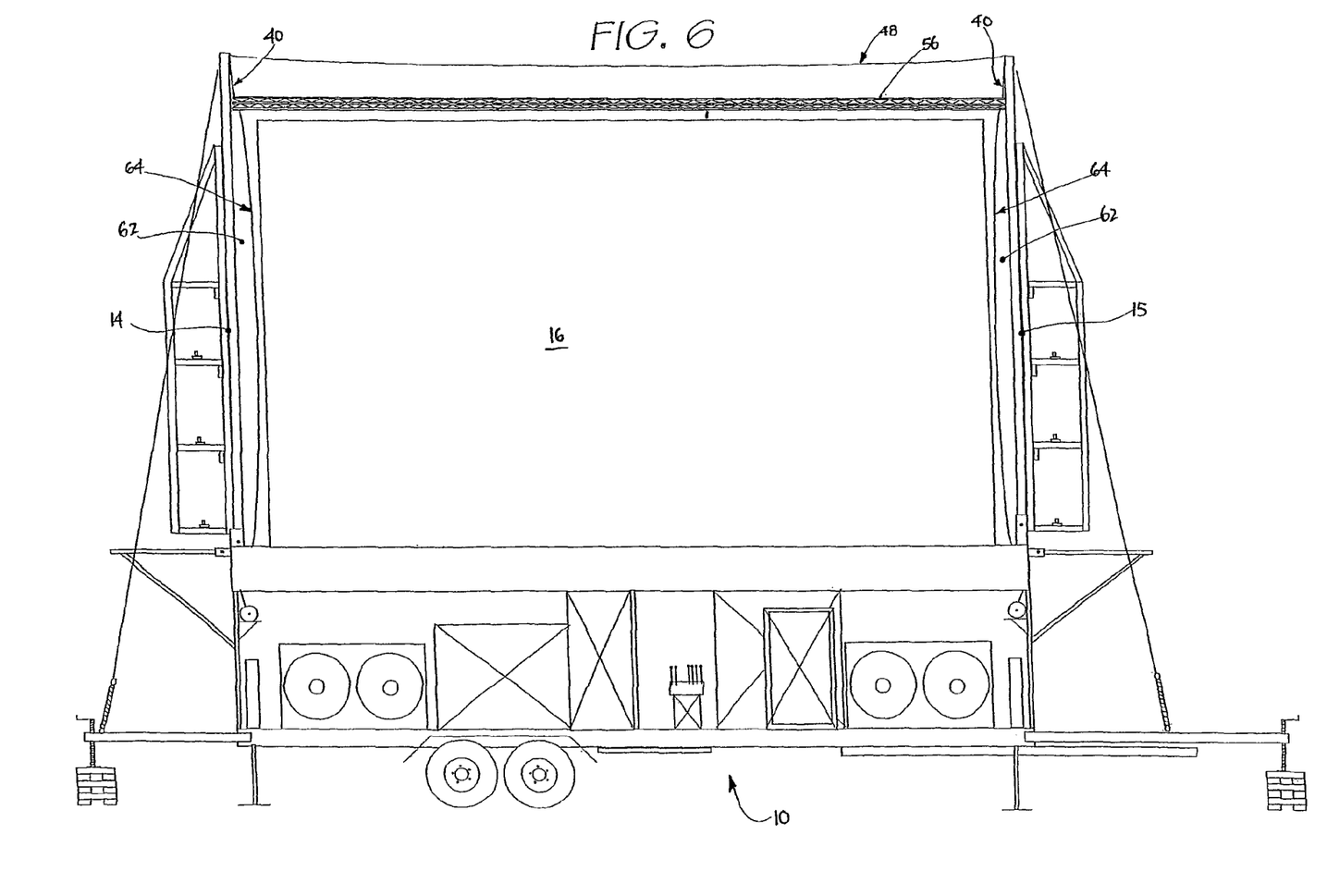
FIG. 6 shows the system of FIG. 5 but with the projection screen raised into its final position.
Figure 7:
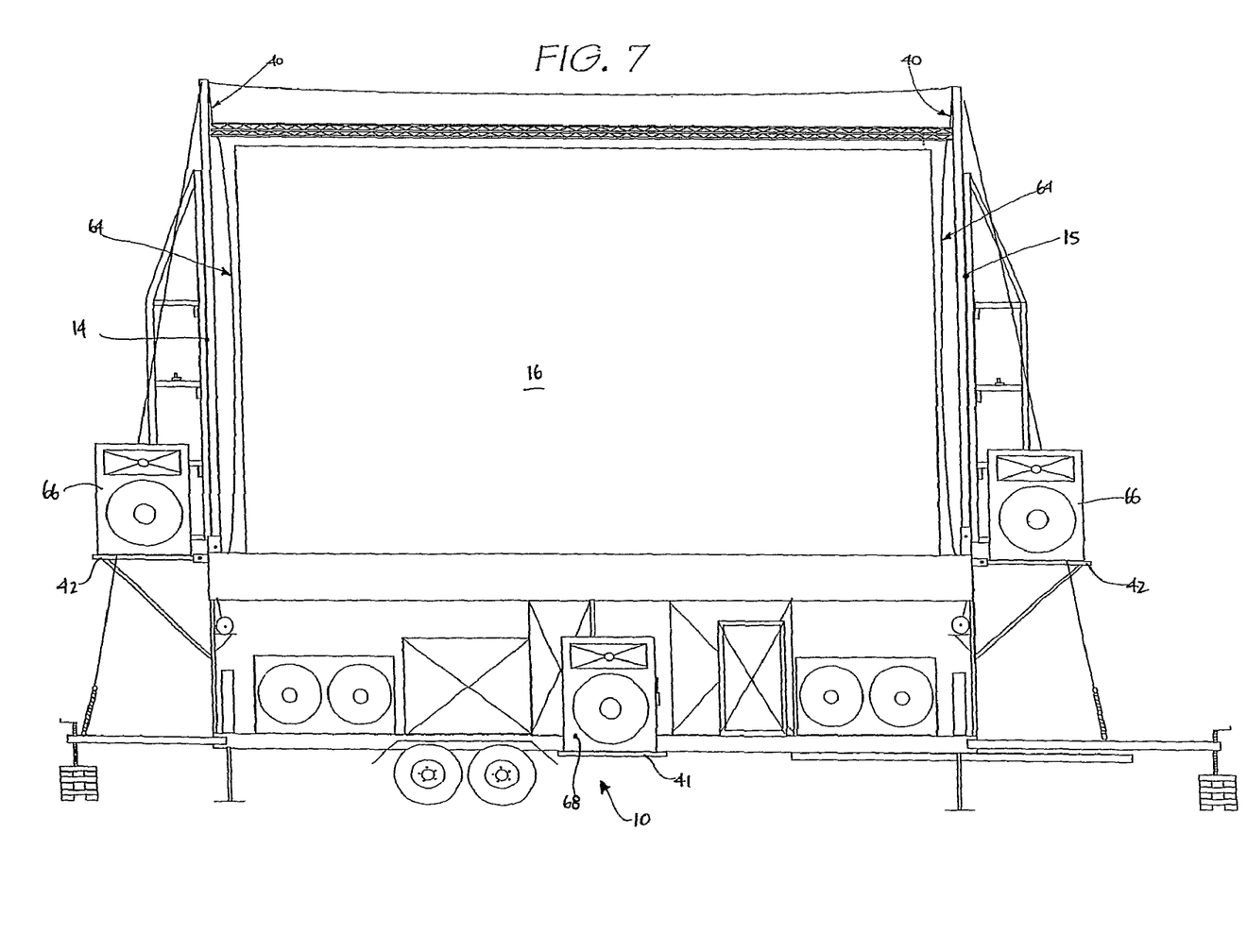
FIG. 7 shows the system of FIG. 6 in a final stage of erection (ie. with loud speakers positioned on left, centre and right supports)
Figures 8, 9:
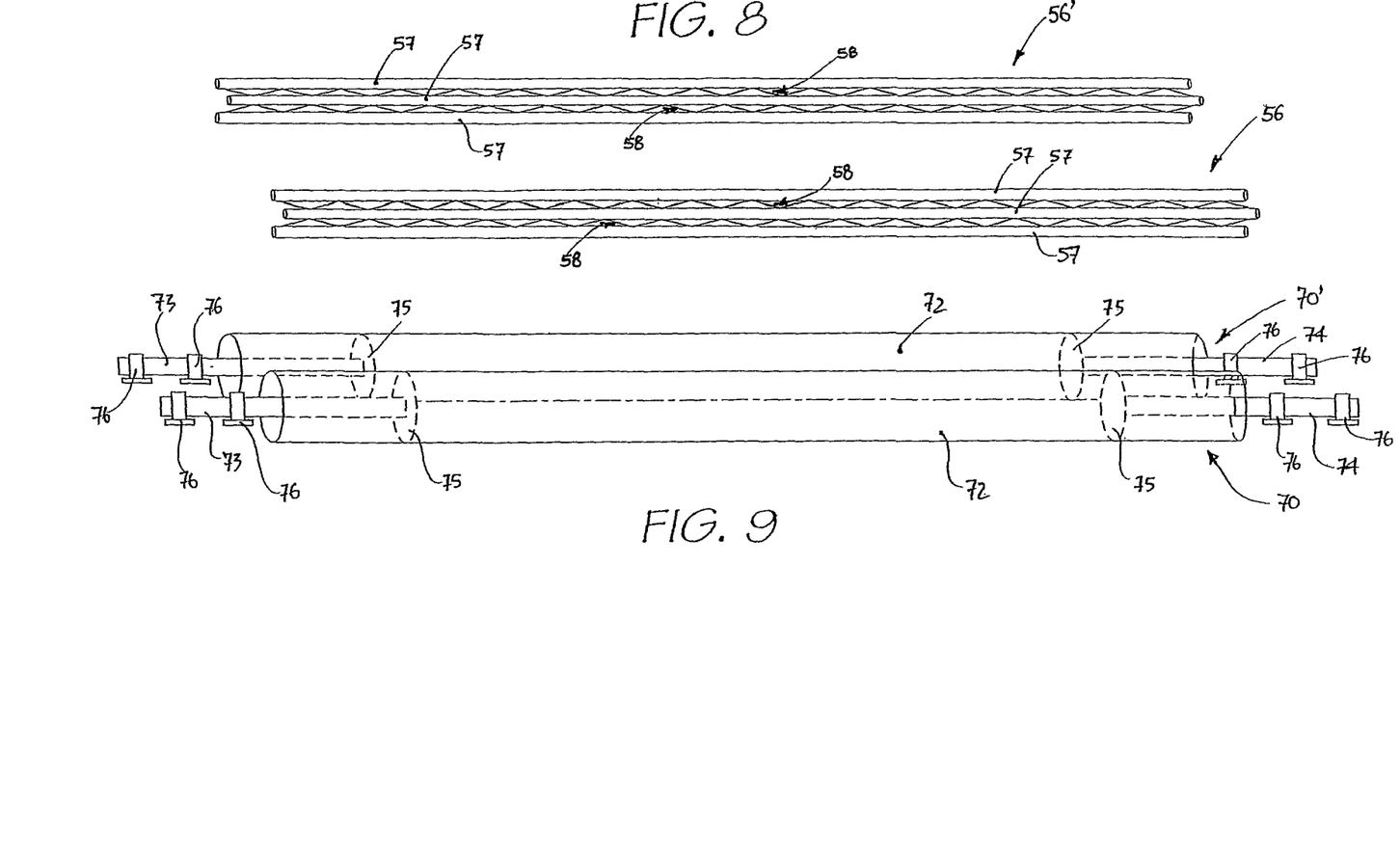
FIG. 8 shows a perspective view of front and rear screen leading edge structural members.
FIG. 9 shows a perspective view of front and rear roller spools for respective front and rear screens of the system in accordance with the invention.
Figure 10:
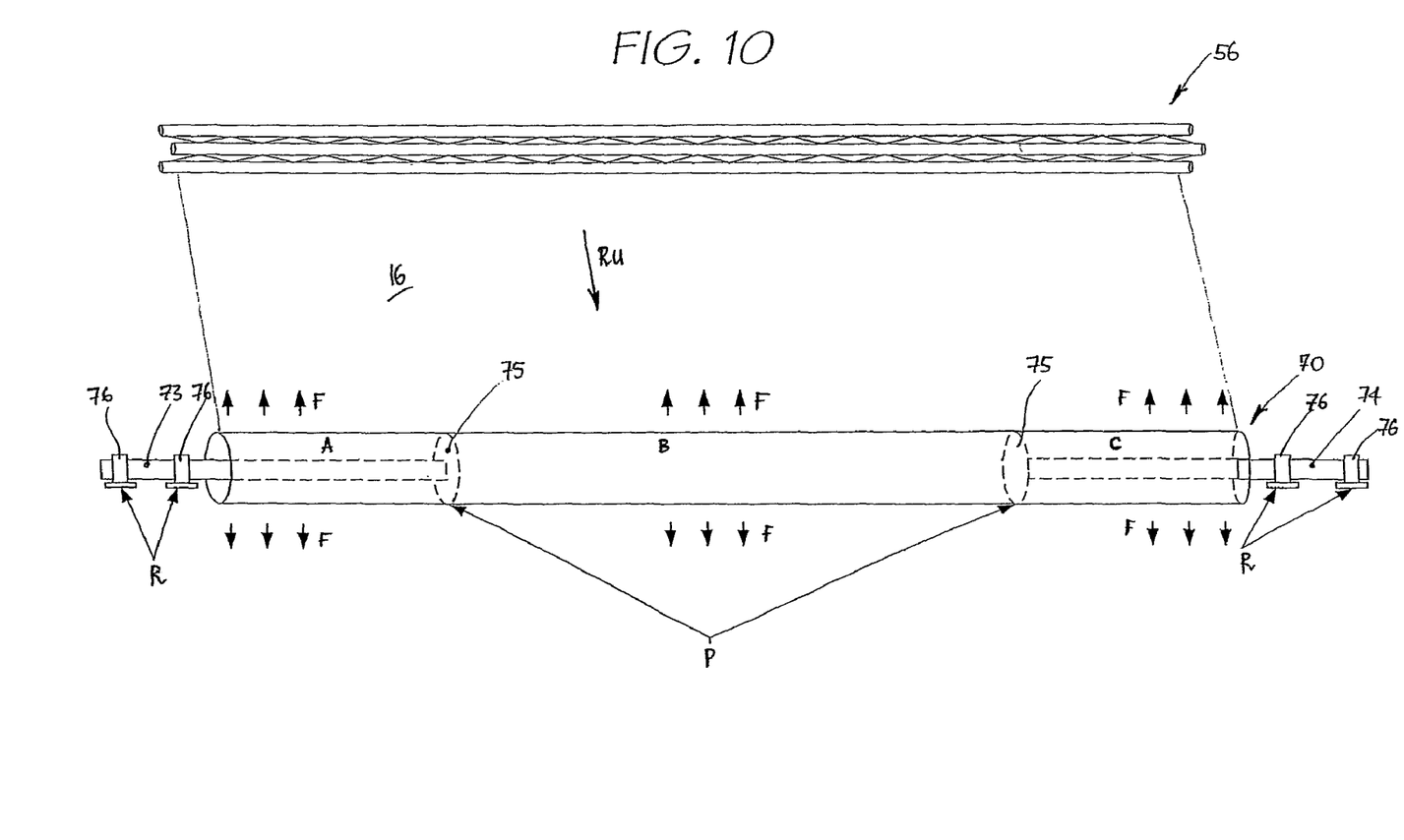
FIG. 10 shows a schematic perspective view of one of the members of FIG. 8 and one of the roller spools of FIG. 9 and illustrating roller forces on the roller spool, in accordance with the present invention.

FIGS. 1 to 7 show the sequential erection of a collapsible projection screen system in accordance with the invention. FIG. 1 shows the system in its collapsed (transportation or storage) configuration and FIG. 7 shows the system in its fully erect (in use) configuration. Additional features of the assembly are shown in FIGS. 8 to 10.

Figure 3:
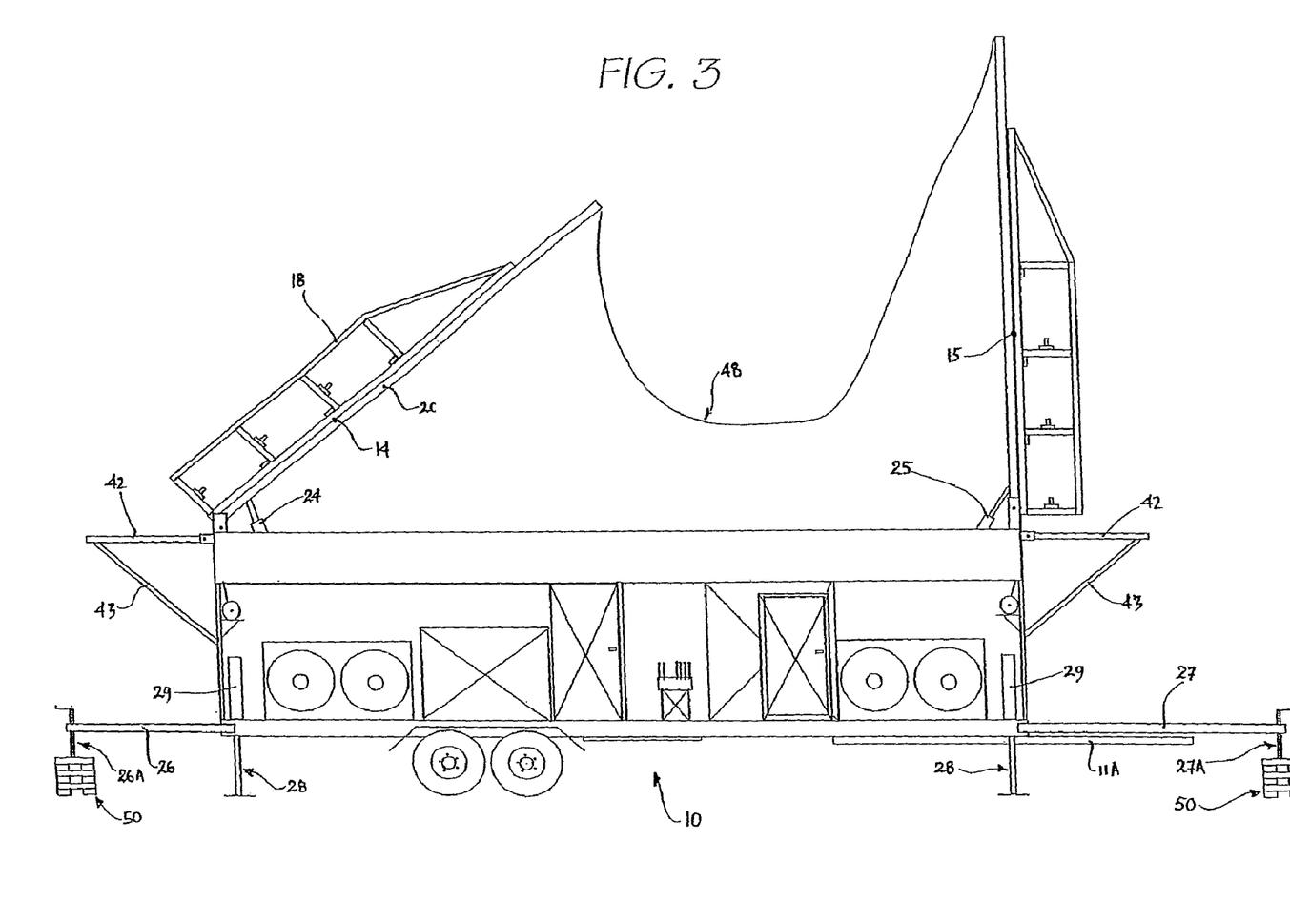
FIG. 3 shows the arrangement of FIG. 2 but in a further stage of erection (stabilising arms and struts in position, right-hand screen support in position, left-hand screen support being pivoted into position)
Figure 4:
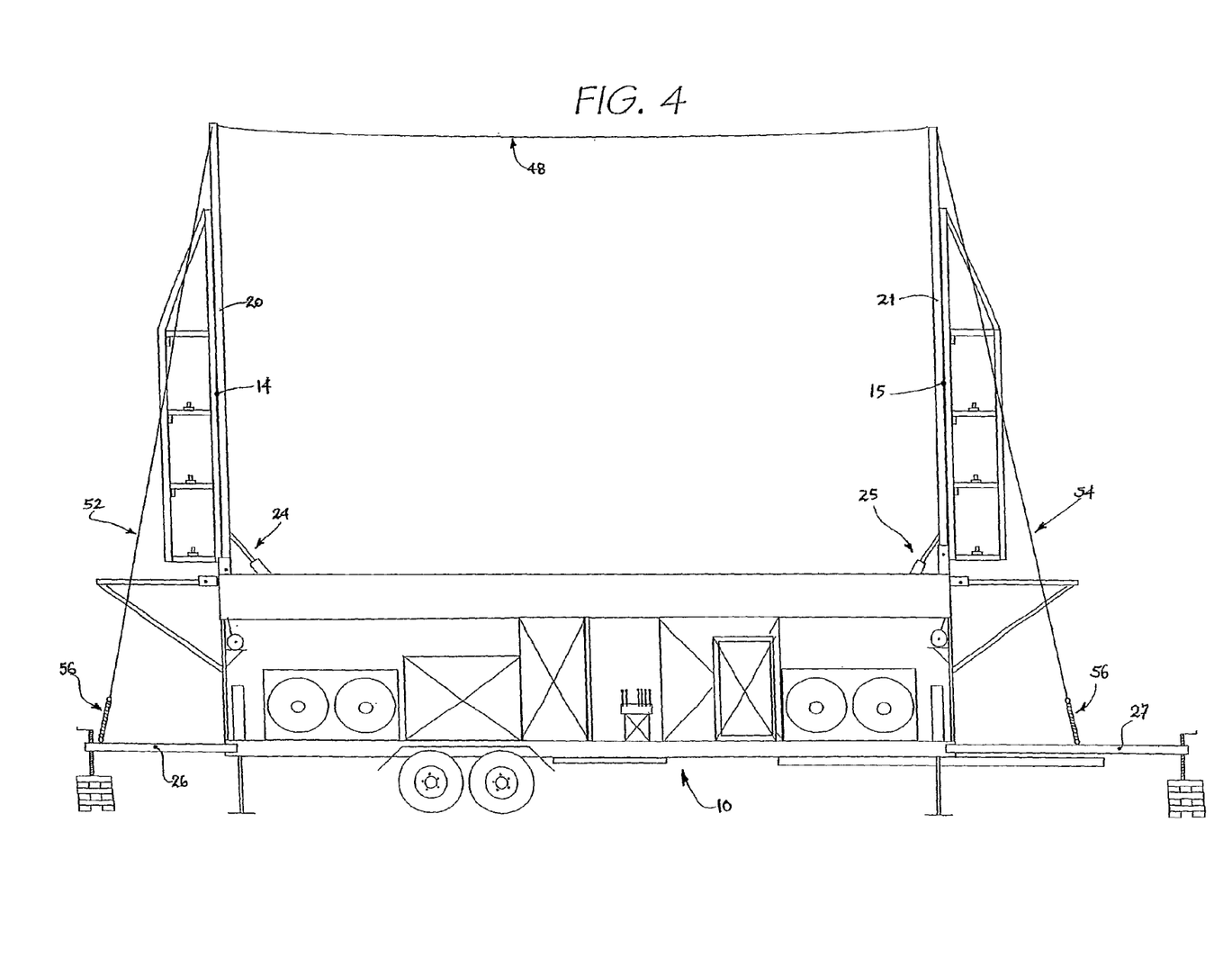
FIG. 4 shows the system of FIG. 3 but in a further advanced stage of erection (left-hand screen support in position and left and right-hand supporting cables tensioned)

As shown in FIGS. 1 to 7, the collapsible projection screen system typically comprises and is incorporated into a trailer 10. The system further comprises a chassis 11 to which is mounted a wheel assembly 12 and a trailer superstructure 13. A trailer hitch 11A extends from the chassis. Left and right screen support assembles 14, 15 are hingedly mounted to the superstructure 13 of the trailer 10 and are pivotable between a collapsed position as shown in FIG. 1 and a screen support position as shown in FIGS. 4 to 7. The system also includes a flexible projection screen 16, as shown in FIGS. 5 to 7, which is moveable between a collapsed position and an erect position, the screen 16 being supported by the support assembles 14, 15 when in the erect position.

The sequential erection, and various components, of the collapsible projection screen system will now be described, starting firstly with FIG. 1. It will be appreciated that dismantling of the system is essentially the reverse of the erection sequence.

In FIG. 1 the system is shown in a completely collapsed (transportable or storage) configuration. In this configuration, the support assembles 14, 15 lie one on the other and are positioned substantially flat adjacent to a roof 17 of the trailer superstructure 13. The support assembles comprise respective truss frame sections 18, 19 that are respectively mounted for rotation about support posts 20, 21. The support posts are in turn hingedly connected to respective hinge plates 22, 23 (the plates having differential lengths to enable the flat collapse as shown). The support posts can be pivoted upwardly, by eg. respective hydraulic rams 24, 25, from the flat generally close-facing position with respect to roof 17 (FIG. 1) and into an erect position, extending orthogonally to roof 17 (FIGS. 3 to 7).

An in-situ trailer support arrangement comprises left front and left rear outriggers 26 and right front and right rear outriggers 27 and four front and rear extendible struts 28. The outriggers 26, 27 comprise respective jacks 26A, 27A and the struts 28 comprise a respective ram 29 (eg. hydraulic), with the struts and outriggers each being mounted to be stowed at or within the chassis 11 (FIG. 1). The outriggers and struts are erected as described below.

Also mounted or located within the trailer 10 are speaker sub woofers 30, a generator 31 (in its own sound and heat insulated room or box), an audio and light control room 32 accessed by a door 33, a projection screen system control area 34 including system control console 35, a storage room 36 accessed by door 37, and motorised screen lifting winches 38. A screen roller support region 39 is defined as front and rear troughs in roof 17 and into which respective elongate front and rear screen rollers (described below) are located. The troughs are slightly sloped end-to-end to enable water drainage. Within each end of screen roller support region 39, calliper brakes are also mounted for selectively engaging and restraining respective screen hoisting cables 40 extending from each winch 38 (as described below).

In addition, mounted to the trailer 10 are a slide-out speaker support shelf 41, and collapsible speaker end support shelves 42, the latter each pivotable to an erect position in which they are supported by struts 43 (FIG. 3).

Figure 2:
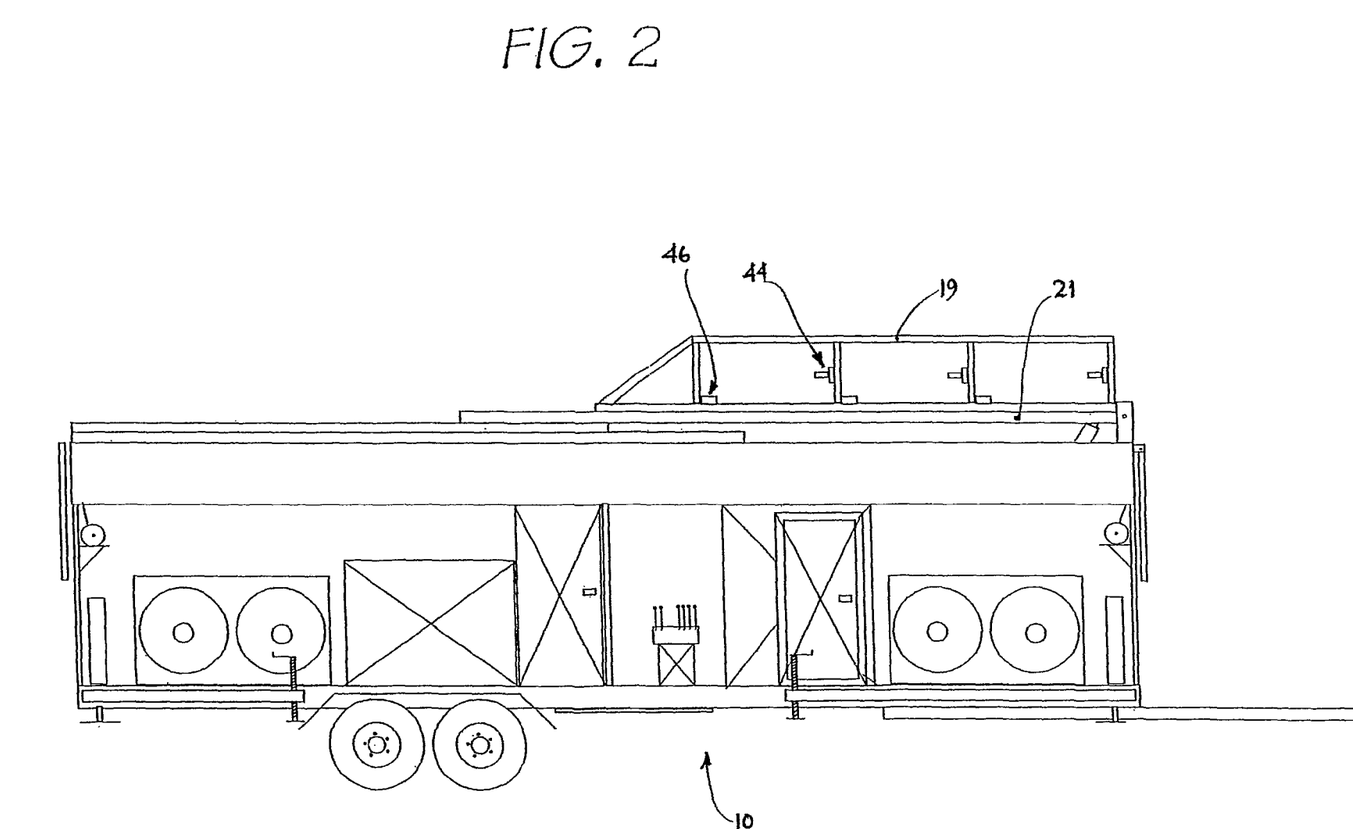
FIG. 2 shows the arrangement of FIG. 1, but in an initial stage of erection (right-hand truss rotated upwardly)

Referring now to FIG. 2, it will be seen that truss frame section 19 has been rotated about its post 21 and is locked in that position by a locking mechanism (eg. one or more locating pins, catches, latches etc). This reveals that each truss frame section comprises a plurality of speaker rigging points 44 and power points 46. In their erect positions the truss frame sections 18,19 can have additional sound speakers or lights attached thereto at speaker rigging points 44 and power points 46 as necessary.

Referring now to FIG. 3, it will be seen that support assembly 15 has been pivoted to its erect position by the action of ram 25. In addition, truss frame section 18 has been rotated about its post 20 and locked in that position by a locking mechanism, and then support assembly 14 has been part-way pivoted towards its erect position by the action of its ram 24. This exposes a linking cable 48 that links the assemblies 14 and 15 together for extra stability against wind action etc in the erect configuration.

In FIG. 3, it will also be seen that outriggers 26 and 27 have been pivotally swung away from the trailer 10 and locked (eg. by a catch, latch or pin locking mechanism). The jacks 26A, 27A on each outrigger have each been wound down to make contact with respective wooden chocks 50 (or the ground). The struts 28 have been driven down to the ground by their respective rams 29 to provide additional stabilising support for the trailer in its stationary in-use position. In addition, the speaker end support shelves 42 have each been pivoted to their erect position in which they are supported by struts 43.

Referring now to FIG. 4, it will be seen that assembly 14 has now been pivoted to its erect position by the action of ram 24. In addition, left front and left rear and right front and right rear stabilising cables 52, 54 are now tensioned via respective turn-buckles 56. The stabilising cables are each connected between a respective outrigger 26 or 27 and the in-use upper end of respective left or right support posts 20, 21. The cables 52, 54 combine with linking cable 48 to provide a series of triangular support configurations to the assemblies 14, 15, thus maximising the stability of the assemblies 14, 15 in the erect configuration against wind action etc.

Referring now to FIG. 5, it will be seen that motorised screen lifting winches 38 have now been actuated to draw on and wind up respective cables 40 to partially lift the screen 16. In this regard, each cable 40 extends from its respective winch 38 through respective calliper brakes located at each end of region 39, and through a respective support post 20, 21 to exit an opening at an upper end of the post (typically exiting over a bearing surface thereat—eg. tracks, pulleys or roller bearings etc). Each cable is then connected to a respective end of an elongate tri-truss member 56 (shown in greater detail in FIGS. 8 and 10), which is in turn connected along a leading edge 58 of the screen 16 and is mounted to extend between and slide along and in respective tracks in each of support posts 20, 21 as shown. The screen 16 comprises a reinforced leading edge region 60 adjacent to tri-truss member 56 and reinforced side edge regions 62 which assist with hoisting the screen 16 into position and holding it in a generally flat configuration in use.

Referring now to FIG. 6, it will be seen that the screen 16 has been fully hoisted into position. It will also be seen that each side edge region 62 has a length of curved cable 64 extending therethrough. The cable 64 is typically retained in an appropriately shaped elongate pocket defined in the side edge region or may be fastened, clipped adhered etc to region 62. An upper end of cable length 64 is connected to an underside of the tri-truss member 56 and a lower end of cable length 64 is connected to a roller for the screen or to a mounting point on the trailer roof.

In accordance with the invention, the cable length 64 is arranged such that, when tension is applied to the upper edge of the screen, through the action of winch-tightened cables 40 on member 56, the cable length 64 is accordingly tensioned and tends to cause a horizontal region of the screen 16 to be drawn taut, thus flattening out screen 16 and preventing the screen from bowing or flexing. Because of the cable curvature, the resulting tension in the screen is maximum at or near a horizontal centre-line through the screen (eg. where screen bowing or flexing can be at its maximum), and progressively decreases for horizontal screen lines or bands at either end of the cable 64 (eg. where screen bowing or flexing is at its minimum).

Alternatively or additionally, tension can be applied to the cable lengths 64 via the lower end of the screen, for example, via a screen roller. This can be achieved by a heavy-duty spring mechanism in the screen roller. Alternatively or additionally, the screen roller can be motor driven to tension the cable length 64.

Typically the calliper brakes are applied to cables 40 either before or after the tensioning is activated. For example, the screen 16 can be hoisted until in its fully erect position. The winches can then be further activated (eg. by a power boost) to apply additional tension to cable lengths 64. This horizontally or laterally increases the tension right through the screen as described above. It also puts greater tension on cables 40, and the calliper brakes can then be actuated to lock cables 40 in this tensioned configuration to thus lock in the lateral tension across the screen 16.

As an alternative, the screen can be hoisted to its erect position, the calliper brakes activated, and then tension can be applied to the screen and to the cables 64 via the lower roller to which the screen is connected. This can be affected by a heavy-duty spring in the roller (ie. by spring re-coil) or alternatively or additionally can be affected by a motor drive connected to the roller. The motor drive and/or the roller can have a locking stop mechanism associated therewith (eg. the use of appropriate gearing) whereby the additional tension is again locked into cable 64 to maintain lateral tension across the screen. The tensioning can also be employed when only partially hoisting screen 16 (eg. to the position shown in FIG. 5) eg. where only part of the screen is required.

Referring now to FIG. 7, with the screen 16 in its fully hoisted position, speakers 66 are positioned on end support shelves 42 and a speaker 68 is positioned on slide-out speaker support shelf 41. The system is now ready for use, for example, as a movie or video screen, as a live action screen, as a billboard or a sign etc.

Referring now to FIG. 8, a more detailed perspective view of two parallel tri-truss members 56 for use in a preferred systems in accordance to the invention is shown. The parallel tri-truss members are attached to the leading edge of respective front and rear screens for use in the system (eg. a backlit rear screen and a forward lit front screen). In this regard, if the system comprises just two support assemblies 14, 15 then one of the two tri-truss members 56 can be engaged with the support assemblies, whilst the other is left in its screen collapsed position. However, where the system comprises respective forward and rear support assemblies then each tri-truss member can be left connected to its respective assembly.

Each tri-truss member 56 comprises three parallel elongate tube members 57, typically of aluminium tube (or an aluminium alloy or other lightweight metal). In end profile the tubes are arranged in a triangular configuration to maximise the strength of the resulting tri-truss member. Extending between adjacent tubes, in a criss-crossing sequence extending for the length of the tubes, are a plurality of struts 58, typically of metal (eg. aluminium, aluminium alloy or other lightweight metal) and typically welded, riveted or otherwise fastened to the tube 57. The tri-truss member may also comprise high strength plastic components, or metal reinforced plastics, resins etc, providing that minimal flexure over the member's length is achieved. This, the tri-truss member provides a very strong and secure arrangement at the leading edge of the screen to prevent screen bowing, flexing etc during hoisting and lowering of the screen, and when erect and in situ. It also facilitates screen tracking and screen interchange in the support assemblies 14, 15. In this regard, each tri-truss member can comprise a hooking and latching point at opposite ends thereof to which the cables 40 can be releasably attached.

Whilst the screen 16 may be retracted by a manual winch, typically the screen is retracted by a spring-tensioned screen roller 70. In this regard, reference is now made to FIGS. 9 and 10. As stated above, the system can employ front and rear screens, respectively used for front and rear image projection. Thus a reflective material can be used for the front screen and a different material (eg. a translucent or transparent material) can be used for the rear screen. Thus, in the preferred arrangement, the system comprises parallel front screen roller 70 and rear screen roller 70'. The front screen roller 70 and rear screen roller 70' are associated with respective tri-truss members 56, 56', with respective screens (not shown) extending therebetween.

Referring particularly to FIG. 9, it will be seen that each of the screen rollers 70, 70' comprises an elongate tube 72. Again, that tube is typically formed from a structural material such as a metal or metal alloy, or a high strength plastics material, optionally reinforced by metal or glass fibre etc. Each tube is typically hollow (or at least hollow at respective ends thereof). Extending into each tube are respective mounting shafts 73, 74. Each shaft comprises a disc 75 fastened to its end, and this disc is in turn fastened around its periphery to the interior surface of the roller 72 at locations inset from respective ends of the rollers. This inset mounting has certain advantages which will be described below with reference to FIG. 10. Typically the discs are welded either at points or circumferentially therearound to the interior of rollers 72, or may be adhesively fastened, riveted etc.

Each of the shafts 73,74 are supported in respective pillar block bearings 76, for example in a roller bearing arrangement, a lubricated cradle etc. Either or both of the left and right block bearing pairs 76 are detachable from the shaft 73, 74 (eg. by lateral sliding of the bearings, or by an arrangement that enables the shaft to be lifted out of engagement therewith) to enable removal of the rollers 72 (eg. for screen replacement, screen servicing, componentry repair, screen interchange etc.

The interior of each roller 72 may be provided with a spring mechanism (eg. a helical spring or other twist-type spring arrangement) which, when the roller is rolled in a direction which unrolls the screen therefrom, is tensioned. Heavy-duty springs can be employed to provide high tension forces on the screen in its erect position, for assistance in flattening out the screen and for assistance with screen rewind. Alternatively or additionally, a motor drive can be coupled to one or both protruding ends of shafts 73, 74 to provide appropriate rewind drive and additional tension effects.

Referring now to FIG. 10, certain advantages associated with the way in which roller 70 is mounted will now be explained. In this regard, as described above, discs 75 connected to shaft 73, 74 are mounted to the roller interior at locations inset from respective ends thereof. This mounting provides so-called screen "pick-up points" P. Typically the shafts 73, 74 are rigidly mounted R to block bearing 76 in a manner that prevents lateral sliding of the shafts in the bearings. Such mounting enhances screen pick-up at the pick-up points P.

In a typical large screen application (eg. where the screen is 8 meters wide or more) there will inevitably be some degree of flexure in roller 70. Because of the inset mounting of the discs 75, and the rigid mounting of shafts 73, 74, three alternating flexure sections A, B and C are defined in the roller between and on either side of the discs 75. Thus, differentiating flexure forces as depicted by arrows F can be achieved across the length of the roller and typically these forces alternate moving from section A to section B to section C.

The applicant has surprisingly discovered that when the screen 16 is rolled up (ie. as depicted by the arrow RU) the inset pick-up points tend to ameliorate or prevent the formation of creases in the screen, and also tend to centralise the roll-up of the screen on to the roller 70 (ie. to prevent its spill over from either end of the roller). In other words, the rotational pick-up force of the roller is moved towards the centre of the roller, rather than at its ends, and this tends to centralise roller pick-up and force any creases outwardly across the screen.

The inset mounting also provides for tension bands generally aligned with the pick-up points when the screen is in the erect position, these bands being inset from side edges of the screen, which again can assist in flattening out the screen and preventing folding, bowing, buckling etc.

The screen may be perforated to allow passage of air therethrough and to prevent excessive wind loads from being applied to the system. In addition, if necessary, reinforcing rods, battens or the like can be mounted in or attached to the screen when in the erect position to further prevent its distortion and aid in its structural integrity (especially in high wind situations), however, the arrangements described above can eliminate this need.

A typical screen image area is 8 meters wide by 4.5 meters high, although the area and/or the dimensions of the screen may be different for different uses. Each screen 16 may also be used as a front protection screen, a rear projection screen, or a combination of both.

Now that preferred embodiments of the invention have been described, it will be apparent to those skilled in the art that the collapsible projection screen system has at least the following advantages:

1. the system, when collapsed, is conveniently compact and suited to road transport on the trailer;
2. given the configuration of the system, the time taken for erection of the screen system into the erect position is substantially reduced by a factor of approximately five when compared with other collapsible projection screen assemblies of similar size;
3. given the configuration of the system, the cost for manufacturing the system is considerably reduced in comparison with other collapsible projection screen assemblies of similar size;
4. since the screen is not internal of the trailer when in erect position, the potential screen size is larger and viewable by a larger audience;
5. the system is adapted to support sound speakers and lights;
6. tensioning mechanisms are provided which tend to flatten out the screen and prevent its buckling, bowing, folding etc and also maintain and increase its structural integrity, especially in high wind situations;
7. mounting arrangements are provided which also contribute to additional tensioning, whilst also enabling optimal screen wind-up/roll-up to prevent or ameliorate creasing, and provide for central wind-up/roll-up on the roller;
8. the system can provide for the transportation, erection and use of multiple screens using the same or multiple support assemblies, to thereby provide a number of different presentation options;
9. the mounting assembly of the system allows for roller interchange for screen or roller replacement, servicing, maintenance, and for banner/sign interchange etc;
10. the hoisting and lowering of the screen leading edge is enhanced though the provision of an appropriately reinforced structural member that prevents leading edge flexure and enables easy loading/alignment of the leading edges of a number of screens into a support assembly;
11. the employment of a braking device coupled with a drive apparatus enables different screen tensioning effects to be achieved to enhance screen tensioning and to prevent screen buckling, folding, flexure etc in use, especially in high wind situations.

Although the invention has been described with reference to particular examples, it will be appreciated by those skilled in the art that the invention may be embodied in many other forms.

The invention claimed is:

1. A collapsible projection screen system mountable on or at a moveable carriage, the system comprising:
   a flexible projection screen movable between a collapsed position and an erect position in which the screen is supported by a support arrangement; and
   in addition to the support arrangement, a screen tensioning mechanism operable on the screen in the erect position to provide a generally flat screen surface, the screen tensioning mechanism comprising a mechanism that acts at inset pick-up points on in-use upper and lower edges of the screen to additionally apply tension across the screen when in use, providing for one or more in-use vertical tension bands extending between the upper and lower screen edges, the one or more vertical bands applying greater additional tension than adjacent bands extending between the upper and lower screen edges such that the one or more vertical tension bands result in the vicinity of where the lower edge of the screen is mounted to the carriage.

2. A system according to claim 1, wherein in the erect position, the screen tensioning mechanism comprises
a lateral mechanism for acting on opposite sides of the screen to additionally apply tension across the screen when in use.

3. A system according to claim 2 wherein the lateral mechanism provides for maximum additional tension at an in-use centre line located centrally between upper and lower screen edges, progressively reducing to a minimum additional tension adjacent to the upper and lower screen edges.

4. A system according to claim 3 wherein the maximum additional tension is provided by one or two curved cables, each of the one or two curved cables arranged in or at a respective side edge of the screen such that, when tensioned, each cable causes the additional tension to be applied across the screen.

5. A system according to claim 1 wherein the lower edge of the screen is mounted to a roller and the one or more vertical tension bands result in the vicinity of where the roller is mounted to the carriage.

6. A system according to claim 5 wherein the roller is mounted to the carriage via a bearing assembly, the roller being connected to the bearing assembly at two points, each point being inset from a respective end of the roller, whereby a vertical tension band is defined in the vicinity of a respective point to extend vertically in the screen away therefrom.

7. A system according to claim 6 wherein each point is defined in relation to a roller mounting disk that is mounted about its periphery to an inside surface of the roller, with a shaft extending from each disk out beyond the roller for rotational support in the bearing assembly.

8. A system according to claim 1 wherein, in the erect position, the screen is adapted to receive image(s) thereon from one or more projectors located remotely from the carriage.

9. A system according to claim 1 comprising two support members hingedly mounted to the carriage for pivoting between the collapsed and erect positions, the support members being spaced apart when in the erect position such that the screen is mountable to extend between the support members when in the screen erect position.

10. A system according to claim 1 wherein the screen is retractable into its collapsed position.

11. A system according to claim 1 wherein an in-use upper leading edge of the screen is attachable at respective upper corners to respective hoisting apparatus, wherein the hoisting apparatus is arranged to hoist and lower the screen between the collapsed and erect positions.

12. A system according to claim 11 wherein the hoisting apparatus comprises a structural member attached along the leading edge of the screen, cables or tapes attached at opposite ends of the structural member, and a respective winching device for winching each cable or tape to hoist and lower the screen between the collapsed and erect positions.

13. A system according to claim 12 wherein a cable or tape track, or a pulley-wheel, is provided at the end of each support member to enable the cable or tape to respectively slide or move thereupon.

14. A system according to claim 1 wherein a respective truss support is hingedly attached to the support arrangement for pivoting between truss collapsed and truss erect positions.

15. A system according to claim 14 wherein, in the truss erect position, each truss support is adapted to carry one or more sound speakers and/or lights.

16. A system according to claim 1 further comprising a sound system mounted on or at the carriage.

17. A system according to claim 1 further comprising stabilizing supports for stabilizing the carriage on a ground surface when the screen is in the erect position.

18. A system according to claim 1 wherein the screen is perforated.

19. A system according to claim 1 wherein the support arrangement comprises two support members hingedly mounted to the carriage for pivoting between the collapsed and erect positions, the support members being spaced apart when in the erect position such that the screen is mountable to extend between the support members when in the screen erect position.

20. A collapsible projection screen system according to claim 1, wherein the screen in the system has mounted to its leading edge a structural member comprising at least two elongate bars interconnected by a truss-type framework along their lengths.

21. A system according to claim 1 wherein the mechanism is selected from at least one of:
 a) cables;
 b) ties;
 c) rollers;
 d) batons;
 e) reinforcing rods;
 f) braking device; and
 g) inset pick-up points.

22. A screen tensioning mechanism for use in a collapsible projection screen system, comprising
 a mechanism that acts at inset pick-up points on in-use upper and lower edges of the screen to additionally apply tension across the screen when in use and providing one or more in-use vertical tension bands extending between the upper and lower screen edges, the one or more vertical bands applying greater additional tension than adjacent bands extending between the upper and lower screen edges such that the one or more vertical tension bands result in the vicinity of where lower edge of the screen is mounted to a carriage.

23. A collapsible projection screen system comprising:
 a flexible projection screen movable between a collapsed position and an erect position in which the screen is supported by a support arrangement;
 a mounting assembly comprising:
  a roller onto which the screen is rolled in the collapsed position, and from which the screen is unrolled when moving into the erect position; and
  a bearing assembly for supporting the roller during screen movement between the collapsed and erect positions; and
 in addition to the support arrangement, a screen tensioning mechanism operable on the screen in the erect position to provide a generally flat screen surface, the screen tensioning mechanism comprising a mechanism that acts at inset pick-up points on in-use upper and lower edges of the screen to additionally apply tension across the screen when in use, providing for one or more in-use vertical tension bands extending between the upper and lower screen edges, the one or more vertical bands applying greater additional tension than adjacent bands extending between the upper and lower screen edges such that the one or more tension bands result in the vicinity of where the lower edge of the screen is mounted to the carriage, wherein the roller is mounted to the bearing assembly in a manner such that, when the screen is rolled onto the roller, the formation of one or more creases therein is ameliorated.

24. A collapsible projection screen system according to claim 23 wherein the roller is mounted to the bearing assembly, the roller being connected to the bearing assembly at two points, each point being inset from a respective end of the roller, whereby the vertical tension bands ameliorate against the formation of creases in the screen.

25. A collapsible projection screen system comprising:
a flexible projection screen movable between a collapsed position and an erect position in which the screen is supported by a support arrangement;
a mounting assembly comprising:
a roller onto which the screen is rolled in the collapsed position, and from which the screen is unrolled when moving into the erect position; and
a bearing assembly for supporting the roller during screen movement between the collapsed and erect positions; and
in addition to the support arrangement, a screen tensioning mechanism operable on the screen in the erect position to provide a generally flat screen surface, the screen tensioning mechanism comprising a mechanism that acts at inset pick-up points on in-use upper and lower edges of the screen to additionally apply tension across the screen when in use, providing for one or more in-use vertical tension bands extending between the upper and lower screen edges, the one or more vertical bands applying greater additional tension than adjacent bands extending between the upper and lower screen edges such that the one or more vertical tension bands result in the vicinity of where the lower edge of the screen is mounted to the carriage,
wherein the roller is releasable from the bearing assembly to enable roller interchange.

26. A collapsible projection screen system according to claim 25 wherein the roller is mounted to the bearing assembly at opposite ends thereof, wherein one part of the bearing assembly at one end is moveable to enable a roller to be slid into or out of engagement with the bearing assembly.

27. A collapsible projection screen system according to claim 25 wherein the roller is mounted to the bearing assembly in a manner such that, when the screen is rolled onto the roller, the formation of one or more creases therein is ameliorated.

28. A system according to claim 25 wherein the screen is perforated.

29. A collapsible projection screen system according to claim 25, wherein the screen in the system has mounted to its leading edge a structural member comprising at least two elongate bars interconnected by a truss-type framework along their lengths.

30. A collapsible projection screen system mountable on or at a moveable carriage, the system comprising:
one or more support members mountable to the carriage and moveable between a collapsed position and an erect position;
at least two flexible projection screens, each movable between a collapsed position and an erect position, wherein each screen is mountable to the one or more support members; and in addition to the one or more support members, one or more screen tensioning mechanisms operable on at least one of the at least two flexible projection screens in the erect position to provide generally respective flat screen surface, the one or more screen tensioning mechanism comprising a mechanism that acts at inset pick-up points on in-use upper and lower edges of the at least one screen to additionally apply tension across the at least one screen when in use, providing for one or more in-use vertical tension bands extending between the upper and lower screen edges, the one or more vertical bands applying greater additional tension than adjacent bands extending between the upper and lower screen edges such that the one or more vertical tension bands result in the vicinity of where the lower edge of the at least one screen is mounted to the carriage.

31. A system according to claim 30 comprising at least one of:
two support members that can support each of the projection screens in the erect position, and
two respective support members for supporting each projection screen in the erect position.

32. A system according to claim 30 comprising two screens, with an in-use front screen for receiving forwardly projected image(s) thereon and an in-use rear screen for receiving rearwardly projected image(s) thereon.

33. A system according to claim 30 further comprising a screen tensioning mechanism and/or a mounting assembly,
the screen tensioning mechanism comprising:
(a) a lateral mechanism for acting on opposite sides of the screen to additionally tension across the screen in use; and/or
(b) a mechanism for acting on in-use upper and lower edges of the screen to additionally tension across the screen in use, and
the mounting assembly comprising:
a roller onto which the screen is rolled in the collapsed position, and from which the screen is unrolled when moving into the erect position; and
a bearing assembly for supporting the roller during screen movement between the collapsed and erect positions,
wherein the roller is mounted to the bearing assembly in a manner such that, when the screen is rolled onto the roller, the formation of one or more creases therein is ameliorated.

34. A system according to claim 30 wherein, in the erect position, each of the at least two flexible projection screens is adapted to receive image(s) thereon from one or more projectors located remotely from the carriage.

35. A system according to claim 30 comprising two support members hingedly mounted to the carriage for pivoting between the collapsed and erect positions, the support members being spaced apart when in the erect position such that each of the at least two flexible projection screens is mountable to extend between the support members when in the screen erect position.

36. A system according to claim 30 wherein each of the at least two flexible projection screens is retractable into its collapsed position.

37. A system according to claim 30 wherein an in-use upper leading edge of each of the at least two flexible projection screens is attachable at respective upper corners to respective hoisting apparatus, wherein the hoisting apparatus is arranged to hoist and lower each of the at least two flexible projection screens between the collapsed and erect positions.

38. A system according to claim 37 wherein the hoisting apparatus comprises a structural member attached along the leading edge of each of the at least two flexible projection screens, cables or tapes attached at opposite ends of the structural member, and a respective winching device for winching each cable or tape to hoist and lower each of the at least two flexible projection screens between the collapsed and erect positions.

39. A system according to claim 38 wherein a cable or tape track, or a pulley-wheel, is provided at the end of each support member to enable the cable or tape to respectively slide or move thereupon.

40. A system according to claim 30 wherein a respective truss support is hingedly attached to each of the one or more support members for pivoting between truss collapsed and truss erect positions.

41. A system according to claim 40 wherein, in the truss erect position, each truss support is adapted to carry one or more sound speakers and/or lights.

42. A system according to claim 30 further comprising a sound system mounted on or at the carriage.

43. A system according to claim 30 further comprising stabilizing supports for stabilizing the carriage on a ground surface when the screen is in the erect position.

44. A system according to claim 30 further comprising a screen tensioning mechanism and/or a mounting assembly, the screen tensioning mechanism comprising:
  (a) a lateral mechanism for acting on opposite sides of the screen to additionally tension across the screen in use; and/or
  (b) a mechanism for acting on in-use upper and lower edges of the screen to additionally tension across the screen in use, and
  the mounting assembly comprising:
  a roller onto which the screen is rolled in the collapsed position, and from which the screen is unrolled when moving into the erect position; and
  a bearing assembly for supporting the roller during screen movement between the collapsed and erect positions;
  wherein the roller is releasable from the bearing assembly to enable roller interchange.

45. A system according to claim 30 wherein each of the at least two flexible projection screens is perforated.

46. A collapsible projection screen system according to claim 30, wherein each of the at least two flexible projection screens in the system has mounted to its leading edge a structural member comprising at least two elongate bars interconnected by a truss-type framework along their lengths.

47. A collapsible projection screen system mountable on or at a moveable carriage, the system comprising:
  a flexible projection screen movable between a collapsed position and an erect position in which the screen is supported by a support arrangement and,
  in addition to the support arrangement, a screen tensioning mechanism operable on the screen in the erect position to provide a generally flat screen surface, the screen tensioning mechanism comprising a lateral mechanism that acts at pick-up points on opposite sides of the screen to additionally apply tension across the screen when in use, and provides for maximum additional tension at an in-use centre line located centrally between upper and lower screen edges, progressively reducing to a minimum additional tension adjacent to the upper and lower screen edges.

48. A collapsible projection screen system according to claim 47 wherein the maximum additional tension is provided by one or two curved cables, each of the one or two curved cables arranged in or at a respective side edge of the screen such that, when tensioned, each cable causes the additional tension to be applied across the screen.

* * * * *